United States Patent

[11] 3,565,194

[72] Inventors Charles E. Engle
 Tustin;
 Robert E. Reinert, Orange, Calif.
[21] Appl. No. 815,928
[22] Filed Apr. 14, 1969
[45] Patented Feb. 23, 1971
[73] Assignee Dana Laboratories, Inc.

[54] DIGITAL WEIGHING SYSTEM
 9 Claims, 3 Drawing Figs.
[52] U.S. Cl. .......................................... 177/50,
 177/164, 177/210, 177/211
[51] Int. Cl. ........................................ G01g 3/14,
 G01g 19/52, G01g 23/16
[50] Field of Search .................................. 177/1, 50,
 60, 210, 200, 211, 164, 116; 73/65

[56] References Cited
 UNITED STATES PATENTS
RE.24,969 4/1961 Golding ................. 177/200

| | | | |
|---|---|---|---|
| 1,407,078 | 2/1922 | Murray .................. | 177/137 |
| 3,137,357 | 6/1964 | Brenner .................. | 177/210UX |
| 3,234,777 | 2/1966 | Joy ........................ | 177/211X |
| 3,434,343 | 3/1969 | Senour .................. | 177/211X |
| 3,464,508 | 9/1969 | Engle et al. ........... | 177/60X |

Primary Examiner—Robert S. Ward, Jr.
Attorney—Nilsson, Robbins, Wills & Berliner ABSTRACT: A system is disclosed for providing digital indications of the gross or net weights of a load (or accumulated loads), as sensed by electrical load cells. The load cells are energized from a source of reference potential to provide an output signal that is converted to a digital form by a ratioed ramp voltmeter operating in cooperation with a digital counter. The ramp voltmeter is driven by reference potential to provide improved accuracy. An active multipole filter is provided for filtering the signal from the load cell structure to eliminate spurious components thereof created by vibration and the like. The system also incorporates, analogue and digital scaling, flexibility in the use of tare, and a test conversion facility.

INVENTORS
CHARLES E. ENGLE
ROBERT E. REINERT

BY Nilson+Robbins
ATTORNEYS

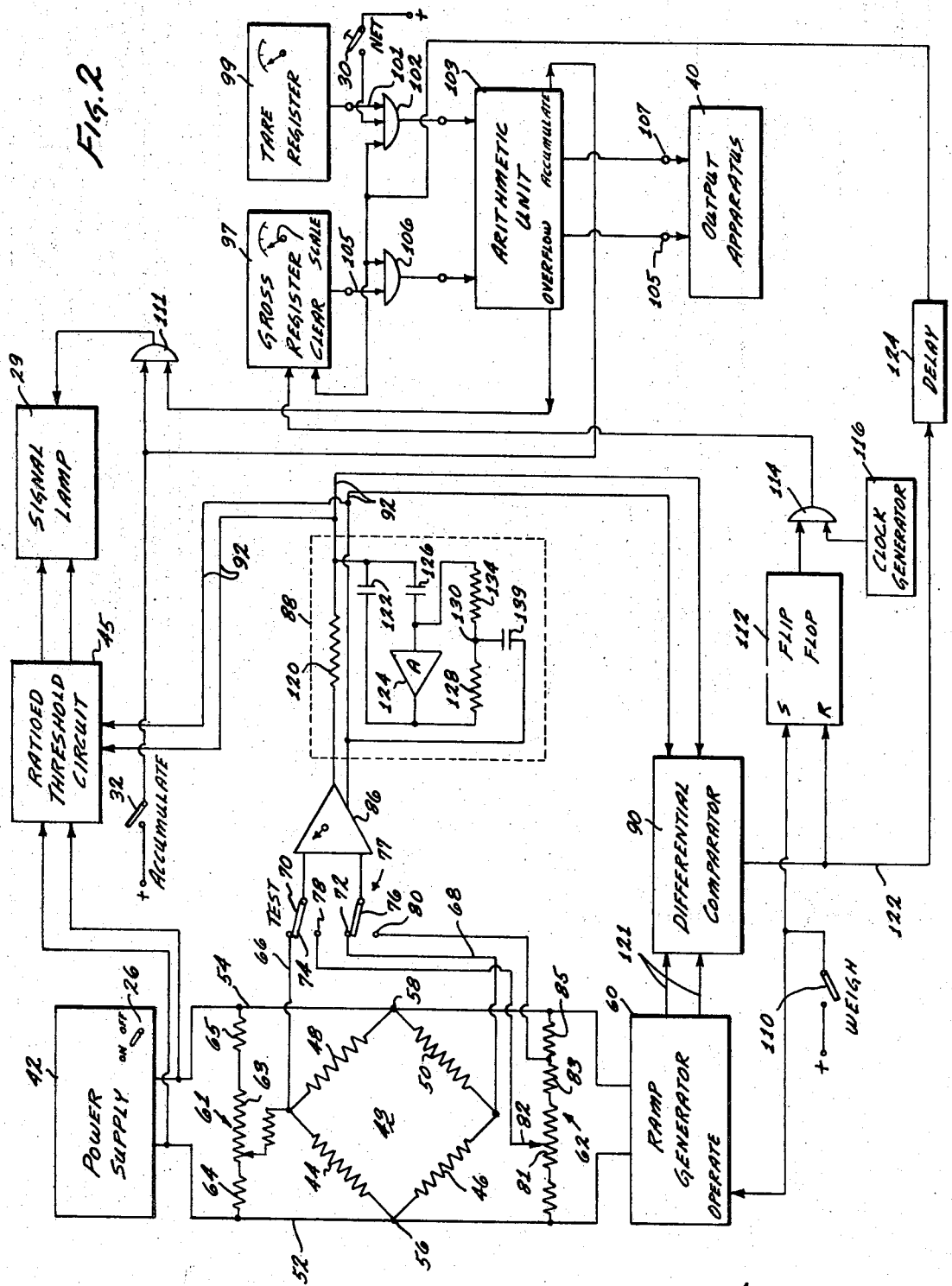

DIGITAL WEIGHING SYSTEM

BACKGROUND AND SUMMARY OF THE INVENTION

The development of variable-resistance load cells and similar units has resulted in a variety of electrical systems for indicating weights. Rather typically, these systems include a rigid platform supported by at least one electrical load cell, which is energized to develop an electrical signal that is indicative of the weight of the applied load. One form of such a system is shown and described in applicants' copending U.S. Pat. application Ser. No. 588,516 entitled "Force Transducer Output Measuring System Employing Ratio Technique."

Although various forms of prior systems have functioned effectively and economically, a considerable need remains for a reliable system which is flexible in operation and is capable of accurately indicating gross, net, and totalized (accumulated) weights in digital form. Such a system would desirably incorporate checking means (to verify that none of the components have changed to significantly alter the accuracy of calibration) analogue and digital scaling capability, and flexibility in programming the tare. In general, the present invention fulfills the needs utilizing a ratioed-ramp analogue-to-digital converter having a filter input. The system also includes scaling means and means for simply and easily checking calibration. Tare weight signals, in digital form are provided for flexible use in combination with gross-indicating signals.

BRIEF DESCRIPTION OF THE DRAWINGS

In the drawings, which constitute a part of this specification, an exemplary embodiment demonstrating various objectives and features hereof is set forth, specifically:

FIG. 2 is a schematic block and circuit diagram illustrating an electrical system embodied in the structure of FIG. 1.

DESCRIPTION OF THE ILLUSTRATIVE EMBODIMENT

Figure 1:
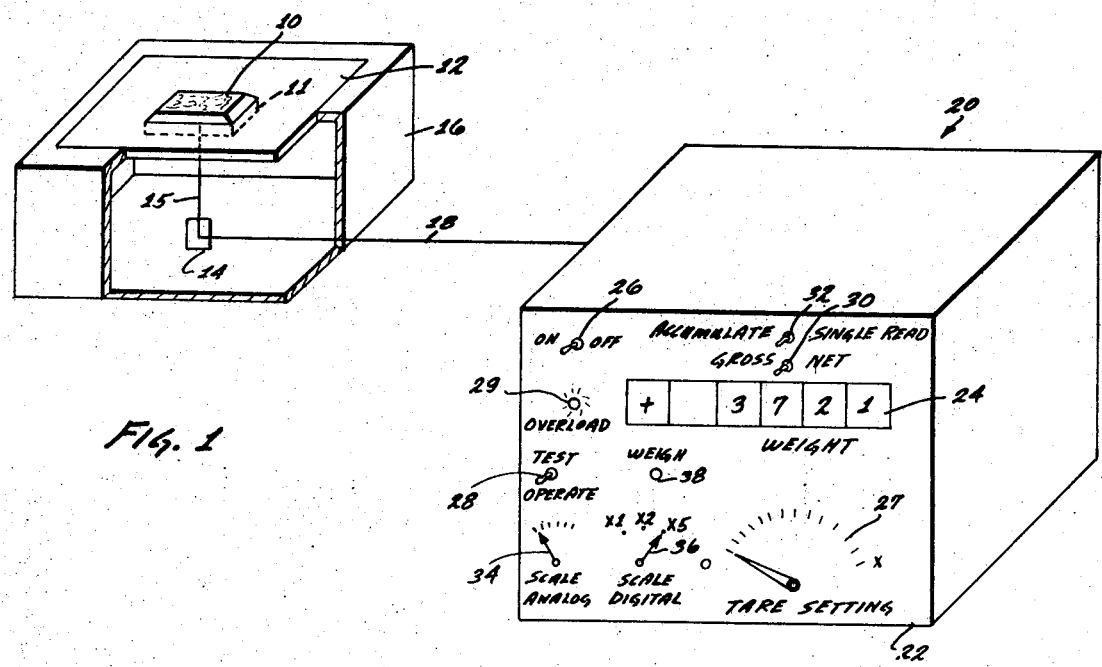
FIG. 1 is a perspective and schematic view of a weight-indicating system constructed in accordance with the present invention.

Referring initially to FIG. 1, the load 10 is shown borne in a container 11 which is supported on a platform 12 that is in turn carried by at least one load cell 14 as indicated by a dashed line 15. Of course, a single load cell may be used, or several may be variously disposed to support the platform 12, as well known in the art. As shown, the load cell 14 is supported on a base 16 which defines a space within which the platform 12 is received.

The load cell 14 is connected through an electrical cable 18 (indicated by a solid line) to a remote unit 20 incorporating a front instrumentation panel 22. The panel includes a digital display window 24 along with several other controls and indicators. Specifically, the panel incorporates an "off/on" switch 26, a tare weight dial 27, an operate/test switch 28, an overload lamp 29, a "gross/net" switch 30, an "accumulate/single read" switch 32, an analogue scale dial 34, a digital scale dial 36 and a pushbutton 38 which commands an actual operation sequence to cause the system to indicate a weight. For example, the gross or net weight of the total load may be indicated by the digital-display window 24.

After being turned "on" the system is operated by pressing the "weigh" pushbutton 38. The load 10 and the container 11 along with the platform 12 then determine the electrical signal provided from the load cell 14. The portion of the signal contributed by the platform 12 is balanced out and the resulting signal is processed to establish a digital display in the window 24. Depending on the manner in which the system is programmed to operate, either tare or gross weights may be displayed as may various combinations thereof. For example, a tare weight may be set on the dial 27 and the system can be operated to subtract such value from a digitally represented gross value so that a net weight is displayed in the window 24.

The dial 27 may be replaced in various systems by such well-known structures as a memory, a card reader or various other means to provide digital tare-weight signals selectively in accordance with a specific container 11.

Other operating programs for the system include the accumulation and display of a plurality of individual weights with or without tare considerations. For example, a tare might be established as a goal from which individual weights are subtracted until the display in the window 24 is zeroed. Alternatively, a series of weights might be accumulated and presented as a current sum in the window 24.

In programming the system, the value of the tare is established by the dial 27. Whether or not the tare value is employed is determined by the switch 30 and whether the system accumulates or makes individual readings is controlled by the switch 32. For example, placing the switch 30 in the "gross" position causes the system to neglect the tare. In the "net" position, the switch 30 causes the system to compute the difference between gross and tare to present the net. As indicated above, values can be accumulated for display in the window 24. Calibration of the system is verified by placing the switch 28 in a "test" position then pressing the pushbutton 38 to produce indications to confirm a prior calibration, or alternatively indicate that a deviation has occurred.

Turning now to the detailed system, reference will be made initially to FIG. 2 in which the digital display is provided by a digital output apparatus 40 (incorporating a display not shown). The system is energized by a power supply 42 (upper left) which incorporates the "on/off" switch 26 and which may supply electrical power to all units in the system in addition to those specifically indicated. However, in the interest of avoiding unnecessary complexity in the drawing, many of the power supply connections are omitted in accordance with conventional practice.

The power supply 42 is shown to be directly connected to a load-cell bridge circuit 43 including strain-gauge resistance elements 44, 46, 48 and 50 connected in a bridge configuration as well known in the electrical art. The conductors 52 and 54 from the power supply reference potential at junction points 56 and 58 (of the bridge) which are located between the resistance elements 44 and 46 and the resistance elements 48 and 50, respectively. The junction points 56 and 58 are also connected to a ramp generator 60 and across voltage dividers 61 and 62. Thus, the bridge circuit 43, the voltage dividers 61 and 62, and the ramp generator 60 are all directly energized by reference potential from the power supply 42. A furthermore, a threshold circuit 45 also connected to the power supply 42, for ratio operation in sensing overloads.

The bridge circuit 43 is incorporated in the load cell 14 (FIG. 1) and provides a signal across conductors 66 and 68 (FIG. 2) that is indicative of the load 10 and the container 11. In this regard, it is to be noted that the signal component contributed by the platform 12 is balanced out by the voltage divider 61. Specifically, the bridge circuit 43 is connected to the tap or movable contact of a potentiometer 63 which is serially connected with resistors 64 and 65 to provide an adjustment that eliminates the signal component resulting from platform weight. Consequently, the conductors 66 and 68 (from the bridge circuit 43) provide a voltage differential to stationary contacts 70 and 72, that is representative of the load 10 and the container 11.

The contacts 70 and 72 are part of a double-pole double-throw switch 77, including movable contacts 74 and 76, respectively. Another pair of stationary contacts 78 and 80 (associated individually with the movable contacts 74 and 76) are connected respectively to a tap 82 of a potentiometer 81 (in the voltage divider 62) and to a junction between resistors 83 and 85 (also in the divider 62). The movable contacts 74 and 76 of the switches are connected through an adjustable amplifier 86 and a filter 88, then through conductors 92 to a differential comparator 90. The threshold circuit 45 is also connected across the conductors 92 to establish a ratio threshold, above which the lamp 29 (FIGS. 1 and 2) is energized to indicate an overload.

The amplifier 86 (FIG. 2) functions to process the received signal as well known in the prior art and may be adjusted to accomplish a full-scale analogue signal, for application to the input of the filter 88 in which alternating components are removed from the information signal. When the load 10 and the container 11 are initially placed on the platform 12 there is considerable shock and vibration, both of which are reflected in the output signal from the bridge circuit 43 as applied through the amplifier 86 to the filter 88. The filter, which is an active multipole filter, eliminates spurious components from the weight-information signal that is applied to a differential comparator 90. During operating intervals, the differential comparator 90 operates with the ramp generator 60 and an associated structure, to develop digital signals representative of the gross weight in gross register 97. The tare weight (provided by a register 98) may be subtracted from the gross, as described below, to accomplish a digital presentation of the net weight by the output apparatus 40. Other modes of operation include the accumulation of weights as described in detail below.

In view of the above preliminary description of a portion of the system as presented in FIG. 2, the operation of the system may now best be understood by explaining exemplary operations concurrently with the introduction of other elements. Therefor, assume initially that the load 10 (FIG. 1) along with the weight of the container 11 produces a weight indicative signal that is developed by the bridge circuit 43 (FIG. 2) and applied through the amplifier 86 and the filter 88 to the differential comparator 90 and the threshold circuit 45. It is to be understood that this weight-indicating signal manifests the gross weight of the load 10 and the container 11.

It is to be noted that the threshold circuit 45 is connected to the conductors 52 and 54 from the power supply 42. The signal potential and the power supply potential, (as received by the threshold circuit) are ratioed, as well known in the prior art, to develop a signal that is truly representative of the gross weight and which, on exceeding a predetermined level, actuates the signal lamp 29 to indicate an overload.

Assuming initially that net weights are to be indicated, the unit is set so that the dial 27 (FIG. 1) indicates the known tare weight of the container 11. As indicated, the dial 27 may be replaced by a card reader or the like for installations in which the container is a mobile unit identified by a card. However, in any event, the dial 27 (or an equivalent structure) controls a tare weight register 99 (FIG. 2) which provides digital signals representative of the tare weight of the container 11. Structurally, the generator 99 may comprise simply a binary-coded-multicontact decimal switch structure controlled in association with the dial 27 as well known in the prior art to provide representative digital signals.

The output from the register 99 is supplied through a cable 101 and an AND gate 102 to an arithmetic unit 103 which subtracts the value represented by such signals from the value represented by gross-weight signals received from the register 97 through a cable 105 and an AND gate 106. The arithmetic unit may comprise a subtraction unit in association with an accumulator, various forms of which are well known in the art, as disclosed in a book entitled Arithmetic Operations in Digital Computers by R.K. Richards, published in 1055, by D. Van Nostrand Company, Inc.

The arithmetic unit 103 may be programmed to accumulate sets of digital signals for display therefrom by the output apparatus, or alternatively, may clear to hold only the last-received set of digital signals. The transfer of signals to the arithmetic unit 103 from the registers 97 and 99 is controlled by a "transfer" signal, the development of which is considered below. The transfer from the tare register 99 through the gate 102 is also conditioned by closure of the "net/gross" switch (FIGS. 1 and 2) WHICH which the gate 102 when net values are to be achieved.

In operation, the arithmetic unit is commanded to accumulate each weight (by adding it to the existing value in the unit) when the "accumulate/single read" switch 32 (FIGS 1 and 2) is closed. On the contrary, if the switch 32 remains open, a lower signal level is applied to the "accumulate" input of the arithmetic unit with the result that each weight observed is registered independently, thereby clearing the prior contents of the arithmetic unit.

Assume initially, for example, that it is desired to read individual (noncumulatively) net weights. Each cycle is initiated by closure of the switch 110 (FIG. 2) which supplies a high-level signal to set a flip-flop 112. When the flip-flop 112 is set, an output therefrom qualifies an AND gate 114 which is also connected to receive pulses from a clock generator 116. As a result, during the interval when the flip-flop 112 is set, clock pulses are applied to the gross register 97. It is to be noted that the gross register is cleared preparatory to a cycle of operation by a "transfer" signal, the development of which is explained hereinafter.

During the interval when the gross register 97 is commended to step, the ramp generator (started by the signal from the switch 110) provides a substantially uniformly increasing potential through a conductor 121 to the differential comparator 90 for comparison with the weight-indicating signal potential received through the conductors 92. The differential comparator 90 provides a low output to a conductor 122 as long a the ramp signal (carried in conductors 121) is less than the load signal carried in the conductors 92. However, as well known in the prior art for circuits of this type, immediately upon the ramp signal attaining the amplitude of the load signal, the differential comparator 90 provides a high output through a conductor 122 to the flip-flop 112 thereby resetting the flip-flop and inturn causing the output to the gate 114, to become low and thereby inhibiting the gate 114 ceasing the application of stepping pulses to the gross register 97.

In that manner, the register 97 is driven by regularly-spaced clock pulses during an interval which is dependent upon the amplitude of the load signal. As a result, the gross-load analogue signal is converted to a time base which is in turn dissected into a digital count which is tallied by the register 97. The gross weight digital signals from the register 97 are supplied to the arithmetic unit 103 along with the tare digital signals from the register 99 upon the qualification of the gates 106 and 102 by the "transfer" signal. That signal, is the signal manifesting amplitude coincidence from the comparator 90, somewhat delayed by a delay circuit 124. That is a delayed signal from the circuit 124 is supplied to the gates 102 and 106 to command the transfer of number-representing signals to the arithmetic unit 103. If, as assumed, net weight is desired, the tare (as represented by the signals passing through the gate 102) is subtracted from the gross (as represented by the signals passing through the gate 106). THe resulting signals (representing net) are held in a register within the arithmetic unit 103 which includes a sign bit as well known in the art. The output apparatus 40 is connected to that register to provide the desired output in a usable form.

If, in the operation of the system it is desired to accumulate a plurality of individually-observed weights, the switch 32 is closed. As a result, an "accumulate" signal is applied to the arithmetic unit 103 commanding such a mode of operation. Consequently, the output register of the arithmetic unit 103 is not cleared by incoming data; rather, such incoming date is added to the previously-held date and the sum is retained for display or other manifestation by the output apparatus 40. As indicated, the output apparatus exhibits a numerical value as stored in the arithmetic unit 103 and received through a cable 105. Additionally, a sign bit which is registered in the unit 103 is also supplied to the output apparatus (through conductor 107) to be manifest.

In the operation of the system to accumulate individually sensed weights, the possibility exist that the capacity of the output apparatus will be exceeded. To provide an indication of such an occurrence, an "overflow" output from the output register in the arithmetic unit 103 is connected to the overflow signal lamp 29 through an AND gate 111, which is qualified by the "accumulate" signal from the switch 32. Thus, should the arithmetic unit 103 overflow during the "accumulate" mode of operation, the signal lamp 29 will be energized to indicate an excess.

Considering now certain detailed aspects of the system, it is to be noted that in the development of the gross-weight digital signals, as the ramp generator 60 is driven by the power supply 42 which also drives the bridge 43, variations in the power supply tend to be compensated. That is, a slight drop in the reference potential from the power supply 42 slightly reduces the amplitude of the weight-indicating load signal from the bridge 43 and concurrently reduces the slope of the output from the ramp generator 60 in a compensatory fashion.

The system, as disclosed also incorporates structure to perform a calibration which may be periodically verified to detect any changes or variations that may affect the accuracy of the system. The system utilizes the signal from the potentiometer 81 as a test signal to provide a representative digital value in the counter 97 to verify prior calibration. More specifically, in calibrating the system, the tap 82 is adjusted on the potentiometer 81 to provide a desired test signal. During such a calibration operation, the movable switch contacts 74 and 76 are set in the lower position so that the potential across a divided portion of the potentiometer 81 is applied through the amplifier 86 and the filter 88 to the differential comparator 90 in the same manner as an actual load signal. The test signal is then converted to provide a digital manifestation from the register 97 which is exhibited by the output apparatus 40. Normally, the potentiometer tap 82 will be adjusted so that a full-scale reading is provided. In subsequent use of the system, this test may be repeated very simply and easily to verify the operating stability and calibration.

As indicated above, various components of the system may comprise circuits and subsystems as well-known in the prior art. However, a particular form of the filter 88 is disclosed in detail and has been found to operate quite effectively. Specifically, the filter 88 is a low-pass active filter for eliminating noise components form the load signal. In this regard, one output line from the amplifier 86 is connected through a resistor 120 to one of the lines 92. The resistor 120 is connected through a capacitor 122 to a frequency-responsive amplifier 124, the output of which is connected through another capacitor 126 back to the input, and through a resistor 128 to a junction point 130. The junction between the input to the amplifier 124 and the capacitor 122 is then connected through a resistor 134 to the junction point 130. Lastly, the junction point 130 is connected through a capacitor 139 back to the reference output from the amplifier 86. Thus, a three-pole active filter is provided. In this regard, it is to be noted that five pole filters have been effectively employed in the system. However, it is critically significant to employ a multipole, active filter.

Figure 3:
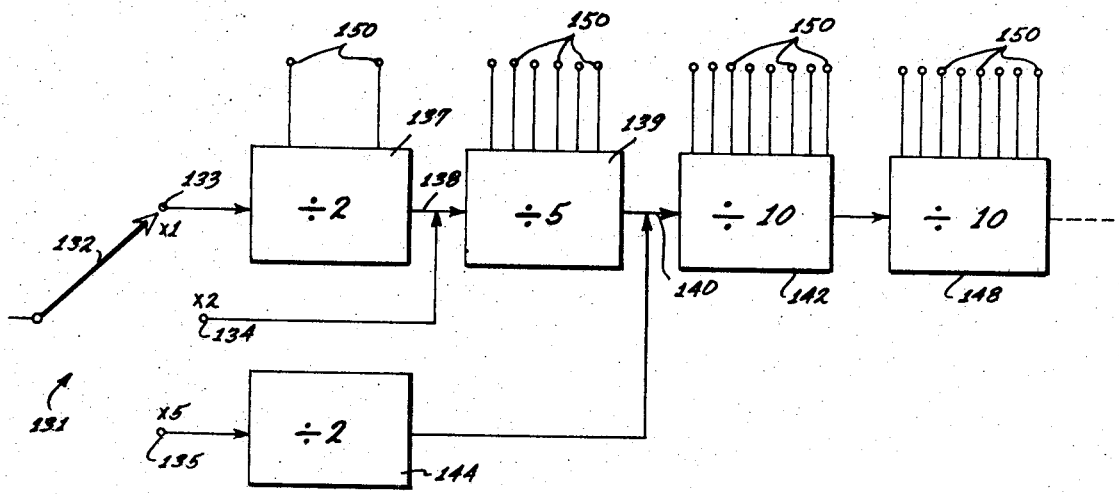
FIG. 3 is a block diagram of a portion of the system of FIG. 2.

As another specific element of the system of FIG. 2, the gross register 97 has been described simply as a counter, e.g. binary-coded decimal counter. However, as suggested above, that unit includes means to digitally scale, i.e. multiply the output by values of 2 or 5. Structurally, the counter or register 97 may be as shown in FIG. 3. Specifically, input pulses are supplied through a scaling switch 131 having a movable contact 132 to individually engage any of its stationary contacts 133, 134 or 135. The input pulses may thus be directed to various binary scalar stages to accomplish scaling.

The contact 133 is connected to a binary, or "scale-of-two"- 'unit 137 which provides one output pulse to a conductor 138 for every two received pulses. The conductor 138 is connected to a "scale-of-five" unit 139 (as well known in the art) for providing an output pulse to conductor 140, for every five input pulses received. The input conductor 138 is also connected directly to the stationary contact 134, while the output conductor 140 is connected to a "scale-of-ten" unit 142 and receives pulses form the contact 135 through a binary 144. The unit 142 is connected to a series of similar units, e.g. unit 148 interconnected a conventional binary-coded decimal stages.

In the operation of the register as shown in FIG. 3, when the movable contact 132 engages the stationary contact 133, input pulses are scaled by 10 by the units 137 and 139. Consequently, these units function jointly as a single binary-coded decimal unit with output terminals 150 as indicated and overflow to the next digital stage, unit 142.

When the movable contact 132 is engaged with the contact 134, the binary 137 is eliminated with the result that pulse trains (and resultant decimal values) are multiplied by 2. A multiplication by 5 may be accomplished by setting the movable contact 132 on the stationary contact 135, in which position pulses are shunted around units 137 and 139 through the binary 144. In that manner, the least-significant digit stage of the register is employed to accomplish digital scaling and greater flexibility of operation.

In operation, basically an RC filter is provided, with the additional consideration that the capacitance therein varies with frequency. As a result, the low-pass filter operating upon the input has a considerably sharper cutoff for output signals appearing from the amplifier 86. The general explanation of this improvement resides in accomplishing a variable capacitance with changes in frequency, which is in turn related to accomplishing a variable gain in the amplifier 124 with changes in frequency as well-known in the prior art. These two variable factors are interrelated as a result of mutual cooperation between the amplifier 124 and the capacitor 122. As a result, alternating components of the signal, i.e. noise from the amplifier 86 are shunted.

Summarizing the system is an effective weighting apparatus that may be employed to accomplish accurate digital signals, indicative of net loads, gross loads, or accumulations and combinations of each. The digital representations are ratioed and may be scaled. The system tends to be somewhat self-correcting with regard to variations in the reference potential from the power supply and additionally enables frequent and convenient calibration checks to verify current operation.

I claim:

1. A system for weighing an applied load, comprising: a platform for receiving said load; a source of reference potential;
  force transducer means for supporting said platform, said force transducer means having varying electrical characteristics in accordance with the load supported thereby;
  means for energizing said force transducer means with said reference potential, whereby to develop an electrical load signal;
  a ramp generator energized by said source of reference potential;
  a digital counter for counting on a time base; and
  means for comparing said electrical load signal with the output of said ramp generator whereby to establish an operating level for said digital counter.

2. A system according to claim 1 further including:
  means for providing digital signals representative of a tare weight portion of said load; and
  means for arithmetically combining signals indicative of the content of said digital counter and said digital signals representative of a tare weight.

3. A system according to claim 2 wherein said means for combining includes an arithmetic unit connected to receive said digital signals representative of a tare weight and also connected to said counter.

4. A system according to claim 3 further including means for applying a portion of said reference potential to said digital means whereby to test the operation of said system.

5. A system according to claim 4 further including multipole active filter means for filtering said electrical load signal prior to application thereof to said digital means.

6. A system according to claim 1, further including means for applying a portion of said reference potential to said digital means whereby to test the calibration of said system.

7. A system according to claim 1 further including means to accumulate said signals indicative of the content of said digital counter.

8. A system according to claim 1 including means to scale the operation of said digital counter.

9. A system according to claim 8, further including means to accumulate said signals indicative of the content of said digital counter and further including means for applying a portion of said reference potential to said digital means whereby to test the operation of said system.